(12) United States Patent
Cline

(10) Patent No.: US 7,272,153 B2
(45) Date of Patent: Sep. 18, 2007

(54) SYSTEM AND METHOD FOR DISTRIBUTED PROCESSING OF PACKET DATA CONTAINING AUDIO INFORMATION

(75) Inventor: Jonathan Cline, Santa Barbara, CA (US)

(73) Assignee: Brooktree Broadband Holding, Inc., Newport Beach, CA (US)

( * ) Notice: Subject to any disclaimer, the term of this patent is extended or adjusted under 35 U.S.C. 154(b) by 1093 days.

(21) Appl. No.: 10/138,700

(22) Filed: May 6, 2002

(65) Prior Publication Data
US 2002/0163918 A1 Nov. 7, 2002

Related U.S. Application Data

(60) Provisional application No. 60/288,419, filed on May 4, 2001, provisional application No. 60/291,648, filed on May 18, 2001, provisional application No. 60/312,351, filed on Aug. 16, 2001.

(51) Int. Cl.
*H04L 15/56* (2006.01)

(52) U.S. Cl. .................. 370/466; 370/353; 710/310

(58) Field of Classification Search ................ 370/392, 370/352–356, 248, 241, 395.21, 401, 235, 370/466, 467, 400; 709/231, 232, 235, 226, 709/204; 704/270.1, 249, 270; 713/161; 379/88.17; 710/310
See application file for complete search history.

(56) References Cited

U.S. PATENT DOCUMENTS 5,105,463 A 4/1992 Veldhuis et al. .......... 704/200.1
5,517,250 A 5/1996 Hoogenboom et al. 375/240.27

(Continued)

OTHER PUBLICATIONS

Chob, Chang Y., DSP Engineering, 2000, "Designing a high-performance echo canceller for Voice-over-IP applications", pp. 1-7.

(Continued)

*Primary Examiner*—John Pezzlo
(74) *Attorney, Agent, or Firm*—Thomas, Kayden, Horstmeyer & Risley, LLP

(57) ABSTRACT

The present invention pertains to a system and corresponding method for distributed processing of packet data containing audio information. The system includes a host processing module for exchanging packet data containing audio information with a data packet network, wherein the host processing module includes host logic for performing non-real-time processing of the packet data. The system also includes a slave processing module coupled to the host processing module for exchanging packet data with the host processing module, wherein the slave processing module includes slave logic for performing real-time processing of the packet data, and for interfacing with a media device.

46 Claims, 6 Drawing Sheets

U.S. PATENT DOCUMENTS

| | | | |
|---|---|---|---|
| 5,541,662 A | 7/1996 | Adams et al. | 348/460 |
| 5,619,554 A | 4/1997 | Hogan et al. | 379/88.1 |
| 5,673,363 A | 9/1997 | Jeon et al. | 704/270 |
| 5,727,211 A | 3/1998 | Gulsen | 718/108 |
| 5,784,649 A | 7/1998 | Begur et al. | 710/52 |
| 5,819,212 A | 10/1998 | Matsumoto et al. | 704/219 |
| 5,850,501 A | 12/1998 | Yanagihara | 386/112 |
| 5,909,224 A | 6/1999 | Fung | 345/531 |
| 5,966,387 A | 10/1999 | Cloutier | 370/516 |
| 6,069,890 A * | 5/2000 | White et al. | 370/352 |
| 6,092,041 A | 7/2000 | Pan et al. | 704/229 |
| 6,128,649 A | 10/2000 | Smith et al. | 709/217 |
| 6,351,730 B2 | 2/2002 | Chen | 704/229 |
| 6,359,656 B1 | 3/2002 | Huckins | 348/512 |
| 6,801,530 B1 * | 10/2004 | Brandt et al. | 370/392 |
| 2003/0014488 A1 * | 1/2003 | Dalal et al. | 709/204 |

OTHER PUBLICATIONS

American National Standard for telecommunications, "Packet Loss Concealment for Use with ITU-T Recommendation G.711", T1.521-1999, 28 pages.

PCT-International Search Report dated Aug. 5, 2002 for Application No. PCT/US02/14080, filed May 6, 2002.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|     PT      |       sequence number         |
+-+-+-+-+-+-+-+-+-+-+-+-+-+-+-+-+-+-+-+-+-+-+-+-+-+-+-+-+-+-+-+-+
|                           timestamp                           |
+-+-+-+-+-+-+-+-+-+-+-+-+-+-+-+-+-+-+-+-+-+-+-+-+-+-+-+-+-+-+-+-+
|           synchronization source (SSRC) identifier            |
+=+=+=+=+=+=+=+=+=+=+=+=+=+=+=+=+=+=+=+=+=+=+=+=+=+=+=+=+=+=+=+=+
|            contributing source (CSRC) identifiers             |
|                             ....                              |
+-+-+-+-+-+-+-+-+-+-+-+-+-+-+-+-+-+-+-+-+-+-+-+-+-+-+-+-+-+-+-+-+
```

FIG. 1 (PRIOR ART)

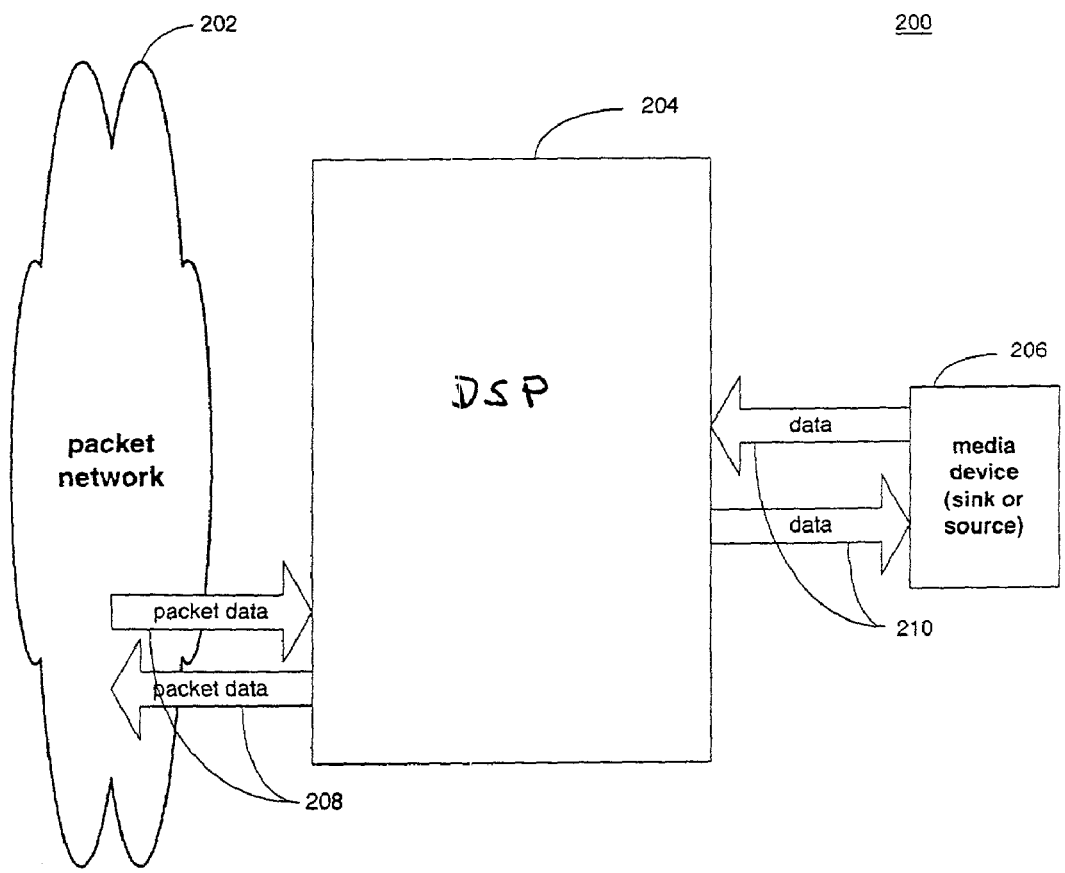

FIG. 2 (PRIOR ART)

SYSTEM AND METHOD FOR DISTRIBUTED PROCESSING OF PACKET DATA CONTAINING AUDIO INFORMATION

CROSS REFERENCE TO RELATED APPLICATIONS

This application claims the benefit of U.S. Provisional Application No. 60/288,419, filed on May 4, 2001, which is incorporated herein by reference in its entirety. This application claims the benefit of U.S. Provisional Application No. 60/291,648, filed on May 18, 2001, which is incorporated herein by reference in its entirety. This application also claims the benefit of U.S. Provisional Application No. 60/312,351, filed on Aug. 16, 2001, which is also incorporated herein by reference in its entirety.

FIELD OF THE INVENTION

The present invention generally relates to a system and method for processing packet data containing audio information. In a more specific embodiment, the present invention relates to a system and method for distributed processing of packet data containing audio information using the real time protocol (RTP).

BACKGROUND OF THE INVENTION

It may be helpful to consider communications protocols and networks employed to effect data communication among communicating devices. When transmitting and receiving data among two or more devices, such as computers via modems, it is typically necessary to employ a common communications protocol or format, or at least complimentary protocols or formats. A transmitting computer or device supports a protocol, in hardware or in software, that is common or effectively conversive with the protocol supported by the receiving computer or device to effect communication of essentially uncorrupted data. To make data communication effective, protocols determine certain operating characteristics, for example, rate of transmission (in baud or bps), transmission mode, i.e., half-duplex or full-duplex mode, synchronous or asynchronous transmission, the type of error checking to be used, the data compression method, notification by a transmitting device of message termination, and notification by a receiving device that the message was received. There are a number of standard protocols available to designers for selection based on respective advantages and disadvantages and depending upon the system needs.

A protocol system model that has served as a starting reference point for many protocols in use is the Open System Interconnection (OSI) model, which defines a networking framework for implementing protocols in seven layers, commonly referred to as a stack. From lowest to highest the layers are: 1) physical layer, 2) data link layer, 3) network layer, 4) transport layer, 5) session layer, 6) presentation layer, and 7) application layer. Control is passed from one layer to the next, starting at the application layer at a first transmitting device, proceeding to the bottom physical layer, over the channel to the receiving device and back up the layer hierarchy to the application layer. The network layer, for example, may rely on the IP protocol and determine the routing of packets of data from sender to receiver via the data link layer. From the network layer, the transport layer provides a virtual error-free, point-to-point connection so that a transmitting device can send messages to a receiving device and they will arrive un-corrupted and in the correct order. The transport layer establishes and dissolves connections between communicating devices.

Asynchronous Transfer Mode (ATM) is a network technology based on transferring data in cells or packets of a fixed size. The cell used with ATM is relatively small compared to units used with older technologies. The small, constant cell size allows ATM equipment to transmit video, audio, and computer data over the same network, and assure that no single type of data hogs the line. ATM creates a fixed channel, or route, between two points whenever data transfer begins. This differs from TCP/IP, in which messages are divided into packets and each packet can take a different route from source to destination. This difference makes it easier to track and bill data usage across an ATM network, but it makes it less adaptable to sudden surges in network traffic. There are four different types of ATM service: Constant Bit Rate (CBR), Variable Bit Rate (VBR), Unspecified Bit Rate (UBR), and Available Bit Rate (ABR).

Transmission Control Protocol (TCP) over Internet Protocol (IP) (TCP/IP) is the de facto standard for the Internet and private Ethernet networks. TCP/IP was developed by DARPA for internetworking and encompasses both network layer and transport layer protocols. While TCP and IP specify two protocols at specific protocol layers, TCP/IP is often used to refer to the entire DoD protocol suite based upon these, including telnet, FTP, UDP and RDP. TCP enables two communicating devices to establish a connection and exchange streams of data. TCP effects delivery of data and in such a way that packets are delivered in the same order in which they were sent.

User Datagram Protocol (UDP) is a connectionless protocol that, like TCP, runs on top of IP networks. Unlike TCP/IP, UDP/IP provides very few error recovery services, offering instead a direct way to send and receive datagrams over an IP network. It's used primarily for broadcasting messages over a network and sending data packets efficiently.

Real-Time Transport Protocol (RTP) is an Internet protocol and provides end-to-end network transport functions suitable for applications transmitting realtime data such as audio, video or simulation data, over multicast or unicast network services. RTP alone does not address resource reservation and does not guarantee quality-of-service for real-time services, but it does provide mechanisms for the sending and receiving applications to support streaming data. Typically, RTP runs on top of the UDP protocol, although the specification is general enough to support other transport protocols. The data transport is augmented by a control protocol (RTCP) to allow monitoring of the data delivery in a manner scalable to large multicast networks, and to provide minimal control and identification functionality. RTP and RTCP are designed to be independent of the underlying transport and network layers. The protocol supports the use of RTP-level translators and mixers Data may be transmitted over packet networks that may comprise any number of different distributed networks, intranets, LANs, WANs, and internets. In general, an internet is a set of networks interconnected with routers. The Internet is the largest internet and is a three level hierarchy composed of backbone networks (e.g., ARPAnet, NSFNet, MILNET), mid-level networks, and stub networks. These include commercial (.com or .co), university (.ac or .edu), other research networks (.org, .net), and military (.mil) networks which span many different physical networks around the world with various protocols, chiefly the Internet Protocol (IP).

The advent of the World-Wide Web (WWW) and the use of HTML and HTTP have brought the Internet into the mainstream resulting in the Internet becoming essentially ubiquitous in modern information systems and a universal medium for users. There are many other protocols in use over the Internet supporting applications such as, for example, electronic mail, Usenet, chat, remote login, and file transfer.

There is growing interest in the transmission of voice information over data packet networks. In this technique, analog audio data is converted to digital data (e.g., by PCM encoding), and the digital data is encapsulated into packets suitable for transmission over a packet network, such as the Internet. At the receiving site, the received packets are validated, and reordered if necessary. The audio data is then extracted and presented to an output media device, such as a telephone.

RTP provides one technique for transmitting audio data over a packet network. This technique prepends an RTP header on each payload of audio data. The header provides various information concerning the audio information and the communication session. The combination of the RTP header and the audio payload form an RTP packet. In one manner, the RTP technique then encapsulates the RTP packet as a UDP packet, for example, and transmits this packet over the packet network. While UDP is suggested as an example, this is not necessary as RTP is transport independent.

FIG. 1 shows a header structure currently employed in the RTP standard. The version field (V) identifies the version of RTP in use. The padding field (P) indicates whether the packet includes additional padding information. The extension field (X) indicates whether the header includes an extension field appended thereto. The CSRC count field (CC) specifies the number of contributing source (CSRC) identifiers that follow the fixed header (where a "contributing source" is an entity that contributed to the payload contained in the packet). The marker field (M) marks significant events (such as frame boundaries) in the packet stream. The payload type field (PT) identifies the format of the RTP payload. The sequence number indicates the order that the packet was transmitted relative to other packets. That is, the transmitter increments the sequence number by 1 for each packet transmitted. The transmitter may assign a random sequence number to the first packet it sends. The timestamp field reflects the sampling instant of a first octet in the RTP data packet. The receiver may assign a random value for an initial RTP timestamp, and thereafter increment this value in a linear fashion. The SSRC is a randomly selected code that identifies the source of the RTP packet. Finally, the CSRC list identifies the contributing sources. For instance, contributing source lists may be created by packet mixers for combining audio packets from different sources into a single destination packet.

A RTP Control Protocol (RTCP) protocol augments the RTP protocol by monitoring the delivery of the RTP packets. The RTCP protocol involves the periodic transmission of control packets to participants involved in a communication session. For instance, a receiver involved in a communication session generates a control packet that identifies the fraction of packets lost in the RTP stream, the last sequence number received, the interarrival jitter, etc.

Further information regarding the RTP protocol is described in Schulzrinne, et al. Standards Track, RFC 1889 RTP January 1996, which is incorporated by reference herein in its entirety.

FIG. 2 provides a conventional application of the RTP protocol. This application includes a digital signal processor (DSP) 204, a digital processing device programmed with functionality for performing various specifically-tailored signal processing tasks (commonly on a real-time basis). The DSP 204 interfaces with both a data packet network 202 (such as the Internet) and a media device 206 (such as a telephone unit). In this configuration, the digital signal processor 204 is configured to provide RTP functionality. These functions include RTCP generation and reporting, RTP header generation and validation, time-stamp reordering, sequence generation and validation, etc.

As appreciated by the present inventor, the configuration shown in FIG. 2 may not use DSP resources in an efficient manner. Namely, as appreciated by the present inventor, RTP requires that some tasks be performed on a real-time basis. However, the RTP allows other tasks (such as various statistic-monitoring tasks) to be performed on a non-real-time basis. As appreciated by the present inventor, the combination of both non-real-time processing tasks and real-time processing tasks in a single processor complicates the processing performed by the digital signal processor, potentially leading to inefficiencies in resource utilization. These inefficiencies, in turn, may lead to increased costs of the digital signal processor, and possibly non-optimal performance from the digital signal processor.

Accordingly, there is a need in the art to provide a more effective system and method for processing audio packet data, and in a more particular embodiment, processing audio packet data according to the real time protocol.

BRIEF SUMMARY OF THE INVENTION

The disclosed technique solves the above-identified difficulties in known systems, as well as other unspecified deficiencies in the known systems.

According to one exemplary embodiment, the present invention pertains to a system and corresponding method for distributed processing of packet data containing audio information. The system includes a host processing module for exchanging packet data containing audio information with a data packet network, wherein the host processing module includes host logic for performing non-realtime processing of the packet data. The system also includes a slave processing module coupled to the host processing module for exchanging packet data with the host processing module, wherein the slave processing module includes slave logic for performing real-time processing of the packet data, and for interfacing with a media device.

The distribution of processing functions between the slave processing module and the host processing module provides a more resource-efficient technique for processing of packet data containing audio information (compared to the single-module processing shown in FIG. 1).

Still further features and advantages of the present invention are identified in the ensuing description, with reference to the drawings identified below.

BRIEF DESCRIPTION OF THE DRAWINGS

FIG. 1 shows a conventional header format used in the RTP standard.

FIG. 2 shows a conventional application of the RTP standard using a single digital signal processor.

DETAILED DESCRIPTION OF THE INVENTION

Figure 3:
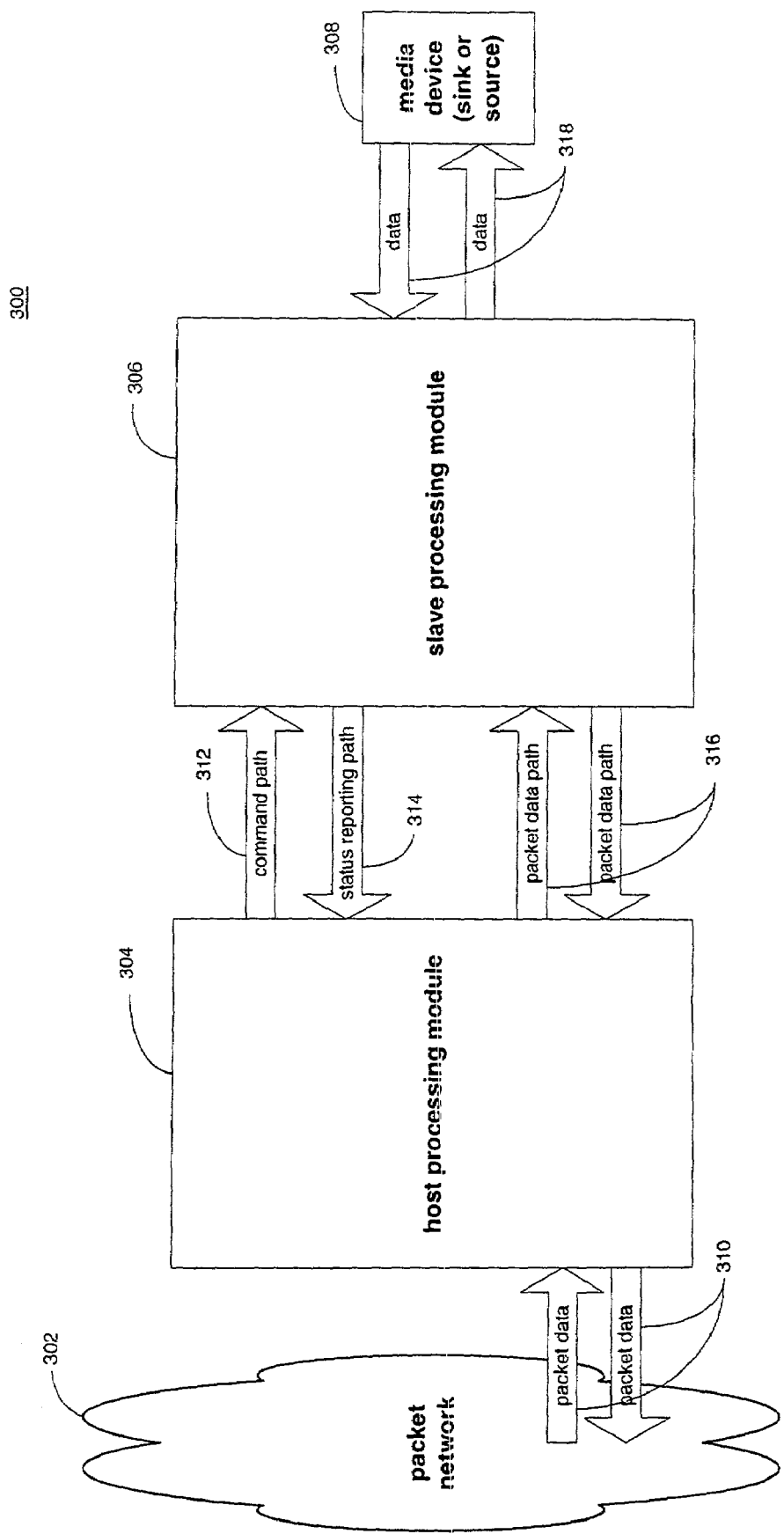
FIG. 3 shows an exemplary system for implementing the present invention using a host processing module and a slave processing module.

FIG. 3 shows an overview of one exemplary system 300 for implementing the present invention. The system 300 includes a packet network 302, a host processing module 304, a slave processing module 306, and a media device 308. Together, the host processing module 304 and the slave processing module 306 implement the RTP processing of audio information in a distributed fashion. Each of the above-described elements in system 300 is described in greater detail below.

To begin with, the packet network 302 may comprise, for example, any type of local-area network (LAN), wide-area network (WAN) or broadband network for transmitting data in packet format. The packet network 302 may comprise some type of network governed by TCP/IP protocol, such as the Internet, or an intranet. In the alternative ATM or other protocols may be used. The network may include any type of physical links, such as fiber-based links, wireless links, copper-based links, etc. The network 302 may operate using any type of network-enabled code.

For instance, OSI defines a networking framework for implementing protocols in seven layers, commonly referred to as a stack. From lowest to highest the layers are: 1) physical layer, 2) data link layer, 3) network layer, 4) transport layer, 5) session layer, 6) presentation layer, and 7) application layer. Control is passed from one layer to the next, starting at the application layer at a transmitting device, proceeding to the bottom physical layer, over a path to the receiving device and back up the layer hierarchy to the application layer. The network layer, for example, may rely on the IP protocol and determine the routing of packets of data from sender to receiver via the data link layer. From the network layer, the transport layer provides a virtual error-free, point-to-point connection so that a transmitting device can send messages to a receiving device and they will arrive un-corrupted and in the correct order. The transport layer establishes and dissolves connections between communicating devices.

The data packet sent over the packet network 302 may have a variable header length and payload area. Generally, the header format may include the fields shown in FIG. 1. Further, in one exemplary embodiment, various fields of information in these packets may be restricted to defined values to facilitate processing using the distributed technique described herein. For instance, the extension bit (X) may be set to 1, indicating that an extension option is not provided. Further, the contributing source field (CSRC) may be set to zero, indicating the lack of contributing sources. Further, the padding bit may be set to 1, indicating that the padding option is not supported. Other header conventions may be appropriate for other applications.

The host processing module 304 primarily performs non-real time processing tasks involved in the RTP protocol. These tasks may include performing RTCP generation and reporting, which involves handling various statistical reporting tasks associated with the delivery of RTP packets. The host processing module 304 may also perform processing tasks associated with interfacing with the packet network 302. The host processing module 304 may also perform miscellaneous application-related tasks pertaining to environment-specific functions that it has been programmed to perform.

On the other hand, the slave processing module 306 primarily performs real-time processing tasks involved in the RTP protocol. These tasks may include performing RTP generation and/or validation. More specifically, the task of RTP generation refers to the generation of RTP packets by appending RTP headers on audio payload segments. The task of RTP validation includes checking various fields in received RTP packets to ensure that the slave processing module may properly decode the payload information. The slave processing module 306 may also perform time-stamp reordering. This task comprises arranging the received packets according to the timestamp information contained in the packets so that they are played back in the correct sequence.

The media device 308 represents any device for generating and/or receiving audio information. For instance, the media device 308 may comprise a telephone type device equipped with a microphone for receiving audio information from a user, and a speaker for presenting received audio information to the user. The media device 308 functions as a source when it generates audio information. The media device 308 functions as a sink when it receives audio information.

The host processing module 304 communicates with the slave processing module 306 using a series of paths. In one embodiment, these paths are implemented as separate communication channels between the two modules. In another embodiment, these paths define a single communication channel that employs interleaving of information from the different paths.

A command path 312 allows the host processing module 304 to transmit various commands to the slave processing module 306. For instance, the host processing module may command the slave processing module to open a communication session, initialize a communication session, end a communication session, etc. Further information regarding these commands is presented in latter sections of this disclosure.

The status reporting path 314 allows the slave processing module to transmit various information back to the host processing module. For instance, the slave processing module maintains statistics on its processing of RTP packets. The slave processing module uses the status reporting path 314 to transmit such statistics back to the host processing module. More specifically, the slave processing module 306 may be configured to transmit the statistics when prompted to by a command transmitted by the host processing module 304. Alternatively, the slave processing module may periodically transmit statistical information to the host processing module without being prompted by the host. In any event, the host processing module 304 may thereafter use this statistical information in generating its RTCP reports to be sent out over the packet network 302.

One or more data packet paths 316 allow for the exchange of packet data between the host processing module 304 and the slave processing module 306. This information may contain the above-described RTP packet format comprising an RTP header appended to an RTP audio payload. When the slave processing module 306 functions as a receiver of such information, it extracts the audio payload information from the packets, assembles an output audio stream, and forwards this stream to the media device 308. The transfers of such data between the slave processing module 306 and the media device 308 is represented in FIG. 3 as path 318.

Figure 4:
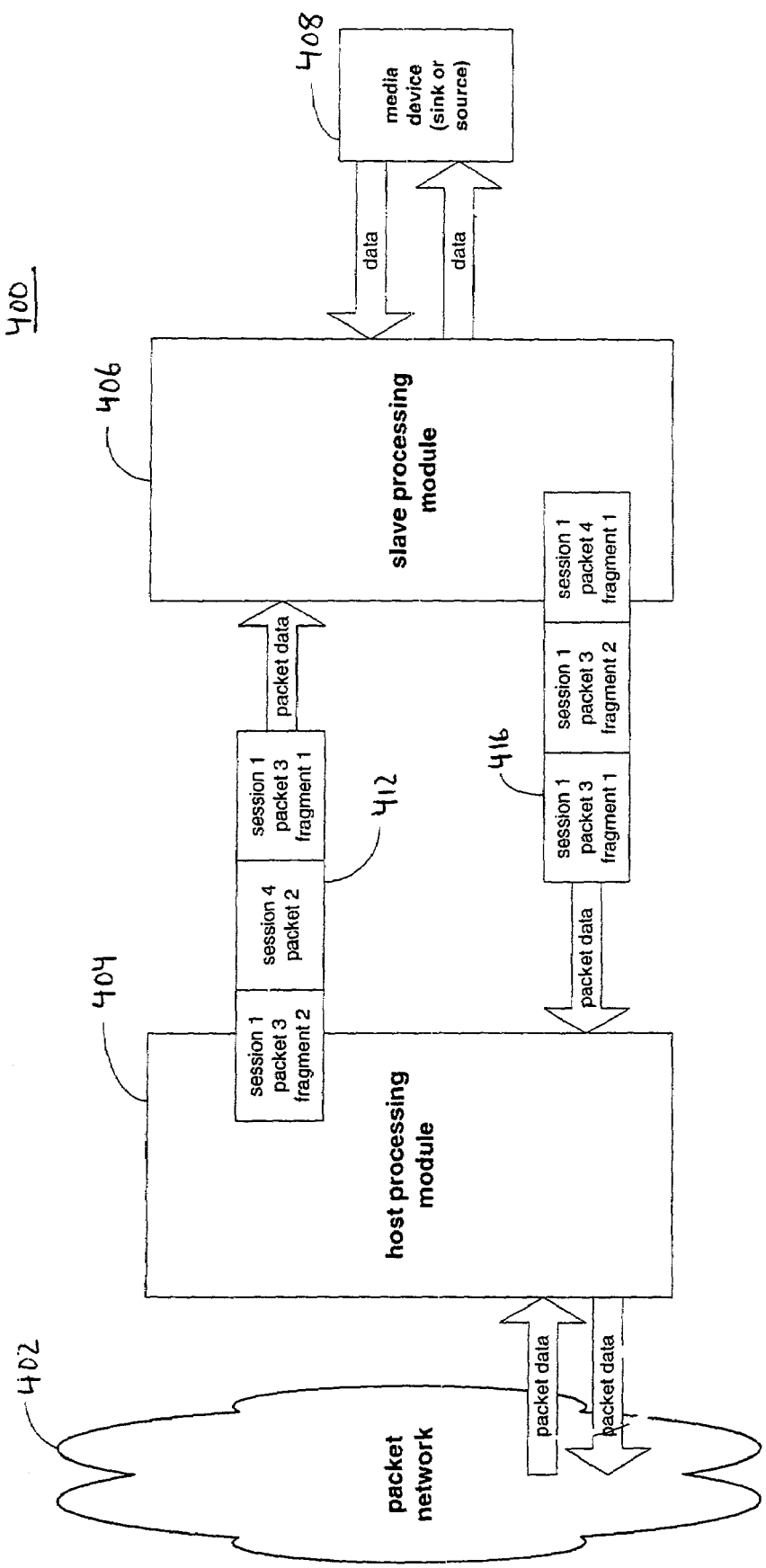
FIG. 4 illustrates the fragmentation of packets transmitted between the host processing module and the slave processing module.

The data packets paths 316 shown in FIG. 3 may be better understood with reference to FIG. 4. More specifically, data packet paths 316 shown in FIG. 3 generally correspond to paths 412 and 416 in FIG. 4. As shown in FIG. 4, each packet transmitted in paths 412 and 416 may be partitioned into multiple fragments and transmitted as separate fragments.

More specifically, in this system 400, the host processing module 404 may interact with the packet network 402 using a first format (e.g., having a first packet size), whereas the slave processing module may interact with the host processing module 404 in a second format (e.g., having a second packet size that is different from the first size). For instance, the packets may be transmitted over the packet network 402 in blocks of 100 bytes. But the slave processing module may receive packets in smaller-sized blocks. To address this situation, the system 400 includes logic for converting between the first and second formats. That is, the host processing module 404 may be configured to receive multiple packet fragments from the slave processing module 406, and consolidate the multiple fragments into a single fragment for transmission to the packet network 402. On the other hand, the host processing module 404 may further be configured to receive a single packet from the packet network 402, and to break this single packet in multiple fragments for transmission to the slave processing module 406. The slave processing module 406 may be configured to generate multiple packet fragments, and assign one header to a set of such fragments.

Figure 5A:
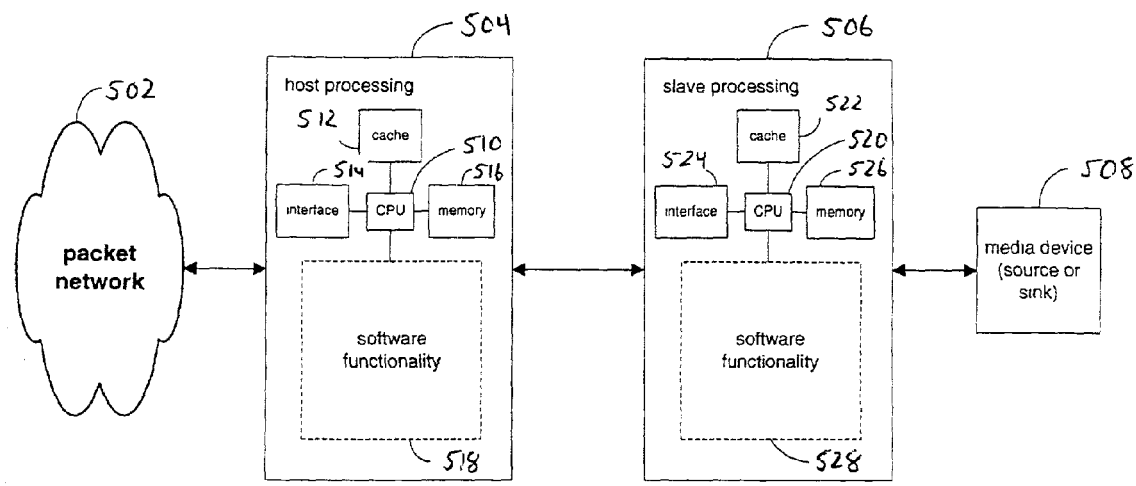
FIGS. 5A and 5B shows two respective exemplary hardware configurations for implementing the host processing module and slave processing module shown in FIG. 3.
Figure 5B:
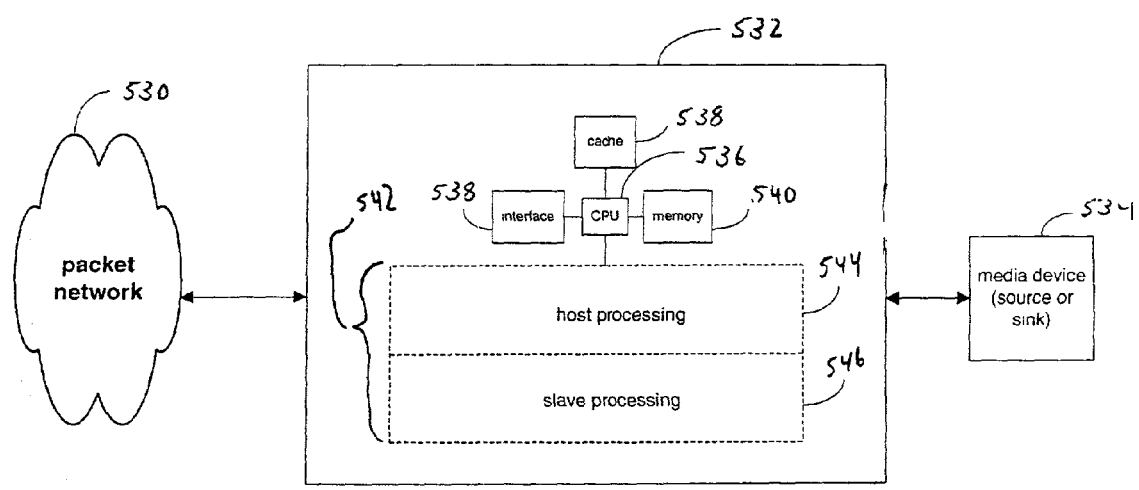

FIGS. 5A and 5B show two exemplary hardware implementations of the system shown in FIG. 3. The FIG. 5A implementation includes a first digital signal processor 504 for interfacing with the packet data network 502, and a second digital signal processor 506 for interfacing with the media device 508. Both digital signal processors (504, 506) may include conventional hardware. For instance, the first digital signal processor 504 includes a CPU 520, memory 516, cache 512, and communication interface 514. The CPU 520 serves as a central engine for executing machine instructions. The memory 516 (such as a Random Access Memory, or RAM) and cache 512 serve the conventional role of storing program code and other information for use by the processor 520. The communication interface 514 serves the conventional role of interacting with external equipment, such as the packet network 502. The digital signal processor 504 also includes logic functionality 518 for executing various processing tasks. This logic functionality 518 may be implemented as software stored in the memory of the processor. The logic functionality 518 stored in the first digital signal processor 504 implements the non-real-time functions performed by the host processing module.

The second digital processing unit 506 may include the same configuration as the first digital signal processing unit 504. Namely, the second digital processing unit 506 includes a CPU 520 coupled to a memory 526, cache 522, communication interface 526, and software functionality 528. The logic functionality 528 implements functions performed by the slave processing module 506, e.g., in real-time fashion.

In the configuration shown in FIG. 5A, the first processor 504 and the second processor 506 may comprise the same basic type of commercial processing unit. However, as described above, the first processor 504 is not primarily entrusted with performing real-time processing tasks. Hence, in another embodiment, a designer may opt to implement the first processor 504 using a relatively inexpensive device without the same real-time processing features as the second processor 506. This solution helps reduce the cost of the device.

In contrast, the configuration shown in FIG. 5B includes a single digital signal processor 532 for interacting with the packet network 530 and media device 534. This digital processor 532 may include the same configuration as the first and second digital signal processors 504, 506 shown in FIG. 5A. Namely, the digital processor 532 includes a CPU 536 coupled to a memory 540, cache 538, and communication interface 538. But in this case, the processor 532 includes logic functionality 542 which implements both functions performed by both the host processing module and the slave processing module. Namely, the functionality 542 defines a multi-tasking programming environment, where the host processing functions and the slave processing functions define separate task sets that can be performed in parallel fashion (or quasi parallel fashion), as if implemented by separate processors. In this figure, the host processing functionality is presented by code segment 544, and the slave processing functionality is represented by code segment 546.

Still further ways of implemented the distributed processing of RTP information will be apparent to those skilled in the art, including techniques that split the processing tasks amongst more than two processing actors.

The equipment shown in FIGS. 5A may be located at various sites depending on the application environment. In one embodiment, the host processing module and the slave processing module are located in close proximity to each other. For instance, these units may be located in the same physical chassis. In another embodiment, the host processing module is positioned at a remote location relative to the slave processing module. For instance, a system designer may opt to implement the host processing module at a central location within a facility to service multiple slave processors (not shown).

Of course, in the FIG. 5B embodiment, the host processing module and the slave processing module are necessarily located at the same location (because they are implemented as a single digital signal processor.).

In a similar fashion, a system designer may use various strategies in position the media device with respect to the slave processing module. In a preferred embodiment, the slave processing module is located in close proximity to the media device. For instance, the slave processing module and the media device may be integrated into a single communication device (that may or may not also include the host processing module). Still other arrangements of equipment will be apparent to those skilled in the art.

Figure 6:
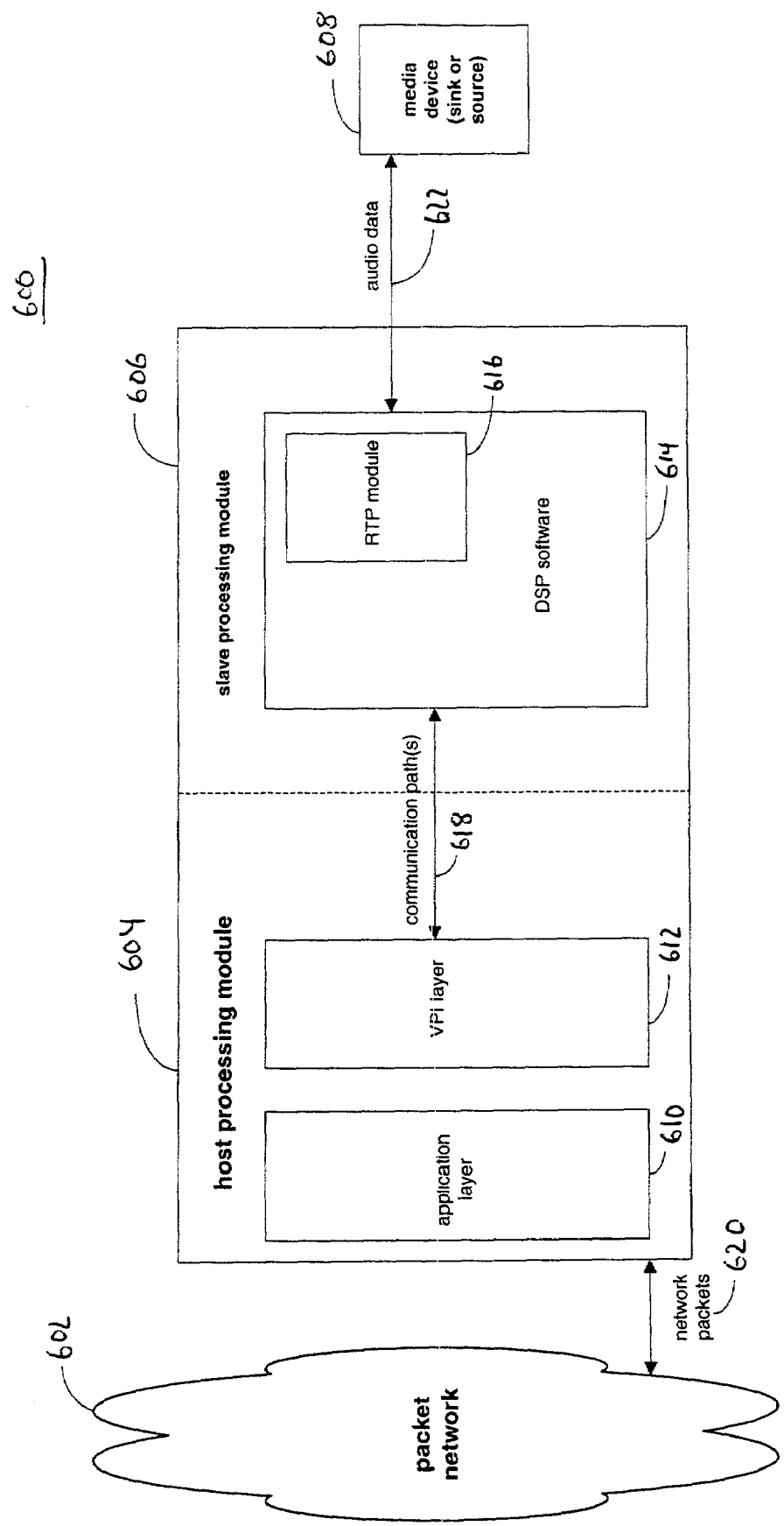
FIG. 6 shows an exemplary allocation of software functionality that may be used to implement the invention shown in FIG. 3.

FIG. 6 illustrates a more detailed depiction of a software configuration 600 of the host processing module and the slave processing module shown in FIG. 3. This particular configuration may correspond to either of the physical configurations shown in FIGS. 5A and 5B (or may correspond to some other configuration). The configuration 600 includes the same basic elements shown in prior figures, including a packet network 602, host processing module 604, slave processing module 606, and media device 608. A packet data path 620 couples the packet network 60 with the host processing module 604. An audio data path 622 couples the slave processing module 606 and the media device 608.

Further, various communication paths 618 couple the host processing module 604 and slave processing module 606, such as the command path, status path, and data paths shown in FIG. 3.

As indicated in FIG. 6, the host processing module 604 includes application layer logic 610 for performing one or more application-related functions (which depend on the particular application and processing environment of the invention). The application layer logic 610 also interfaces with the packet network 602 using any number of known interface protocols. The host processing module 604 also includes a voice processing interface (VPI) layer 612 for performing various tasks required for interaction with the slave processing module 606.

The slave processing module 606 may include DSP software functionality 614 for performing various tasks typically associated with the processing of digital audio information. This functionality 614 is also modified to include particular functionality 616 for carrying out the slave-side RTP features identified above (such as RTP generation, validation, timestamp reordering, etc.).

Figure 7:
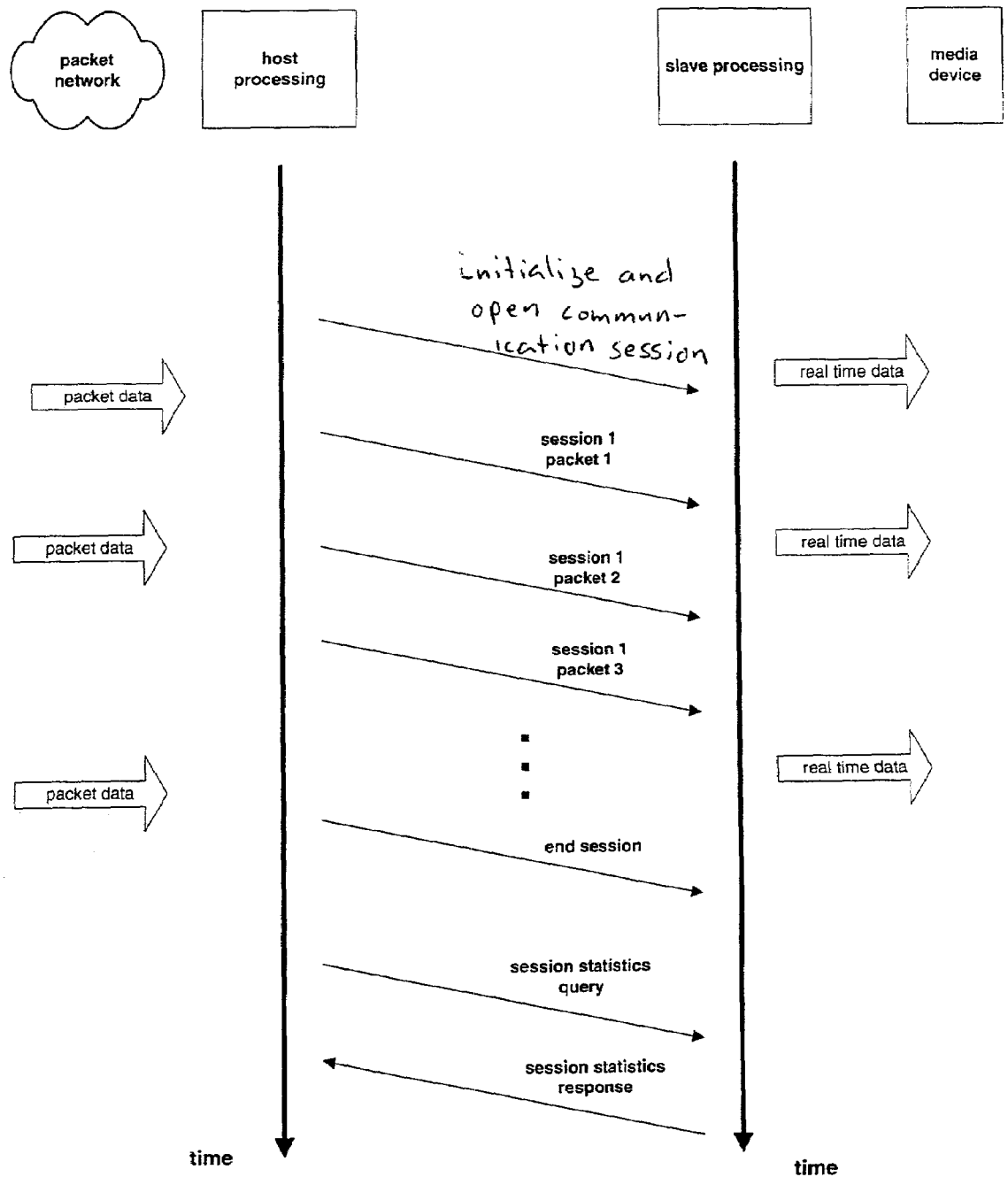
FIG. 7 shows information that may be exchanged between the host processing module and the slave processing module shown in FIG. 3.

FIG. 7 identifies the exchange of data between the host processing module and the slave processing module for a session in which the media device acts as a sink (e.g., as a recipient of audio information). In this figure, the host processing module initially commands the slave processing module to initialize and open an RTP session via the command path (in this case, as a sink for packet data).

The host processing module then proceeds to transfer RTP packets to the slave processing module via the data path. In one scenario (shown in FIG. 4), the host processing module breaks the packets into multiple fragments prior to transfer of this information to the RTP processing module. Upon receipt of this information, the slave processing module reassembles the packets from their respective fragments, validates the packets, reorders the packets as necessary, and assembles the audio stream for presentation to the media device. As discussed above, the fragmentation of packets into multiple segments accommodates environments in which the format for data exchange between the packet network and host processing module differs from the format for data exchange between the host processing module and the slave processing module.

At the termination of the communication session, the host processing module instructs the slave processing module to terminate the session via the command path (e.g., using the end session procedure).

Further, at various junctures in the communication session, the host processing module may request the slave processing module to forward statistical information that the slave processing module has collected to the host processing module. In the illustrated case shown in FIG. 7, for instance, the host processing module forwards a session statistics query at the termination of the communication session. The slave processing module responds by transmitting its statistical information via the status path.

A communication session involving the use of the media device as a source follows a similar procedure. In this case, the slave processing module may notify the host processing module of its intent to transmit audio data into the packet network. The host processing module then proceeds to initialize and open the slave processing module as a source.

Thereafter, the slave processing module receives audio information from the media device, and generates RTP packets by prepending RTP headers onto RTP payloads of audio information. The slave processing module forwards these RTP packets to the host processing module. The host processing module responds to the receipt of these packets by forwarding them to the packet network to their intended recipient. In one scenario, the slave processing module may transmit an RTP packet using multiple fragments (e.g., as shown in FIG. 4). In this case, the slave processing module generates a single RTP header for multiple fragments. Upon receipt of the RTP packets, the host processing module assembles the multiple fragments into a format suitable for transfer over the packet network.

At the termination of the communication session in which the media device is acting as source, the media device may request that the host processing module end the session. The host processing module responds by instructing the slave processing module to terminate the session via the command path (e.g., using the end session procedure).

Further, as discussed above, at various junctures in the communication session, the host processing module may request the slave processing module to forward statistical information that the slave processing module has collected to the host processing module. The slave processing module responds by transmitting its statistical information to the host processing module via the status reporting path.

The host processing module and the slave processing module may implement the above-described functions using various techniques to suit particular application environments. The following discussion addresses one such exemplary implementation strategy.

a) Initialization and Opening of a Communication Session

The initiation of a communication session requires the host processing module to download various configuration information to the slave processing module. The host processing module may perform this function using a "set parameter" command. One way of implementing this function is as follows. First, the host processing module allocates one or more data structures that identify the information required to configure the slave processing module. The host processing module then populates the data structure with the necessary parameters. Thereafter, the host processing module transfers these parameters to the slave by executing the set parameter command. In one embodiment, the host processing module sends this information over a serial port (not shown) for receipt by the slave processing module. That is, the host processing module may create a buffer that contains the command, and then send the command information in that buffer to the serial driver (not shown). The serial driver then ensures that the command is transferred to the slave processing module. In another embodiment, the host processing module may transfer the command information to a memory that is shared by the both the host processing module and the slave processing module. For instance, this memory may comprise a dual-access RAM or similar type of memory. In this case, host processing module transfers the command information to a queue in the shared memory. The slave processing module will thereafter attempt to empty the queue and process the command data contained therein. Still other techniques for transferring information between the host processing module and the slave processing module will be apparent to those skilled in the art.

Further, depending on the programming environment, the host processing module may transmit plural "set parameter" commands to execute the transfer of parameter information to the slave processing device. In still another embodiment, the host processing module may transmit different "set parameter" commands to initialize the communication session, and then to formally open the session for transfer of information.

The specific set of parameters transferred to the slave processing module may vary depending on the specific application. In one embodiment, the host processing module initializes the slave processing module by specifying the following information: ssrcL (identifying the lower 16 bits of the source id, comprising a code assigned to the entity transmitting audio information); ssrcH (identifying the higher id high 16 bits of source id); timestampL; (identifying the lower 16 bits of the timestamp having an initial value set to a random value); timestampH (identifying the higher 16 bits of the base timestamp); direction (identifying whether the media device is functioning as a SINK or SOURCE); seq (identifying the base sequence number having an initial value set to a random value); timeInc (identifying the timestamp increment formed by multiply the frame time by the frame rate; e.g., a frame time of 10 ms multiplied by the sample rate of 8 kHz gives a time increment of 80 samples); rate (identifying the packetization rate of RTP transmission between the host processing module and slave processing module, expressed in the form of the number of packets per header); and probation (identifying the number of packets that may be considered in "probation" before identifying a packet as a bad seq).

The slave processing module may provide a function, e.g., RTP_initSession( ), for handling the data processing tasks associated with initializing the slave processing module. This function may interact with a data structure, e.g., RTP_SessionMsg, for storing the above-identified parameters. The host processing module may contain analogous software functionality and data structures for use in performing the initiation tasks.

Upon initialization, the slave processing information also maintains a data structure that contains all of the state information from the session. An exemplary such data structure (e.g., RTP Session) may contain the following information: RTP_RTCPStats rtcp (identifying RTCP statistics encapsulation); ssrcL (identifying the lower 16 bits of the source id word); ssrcH (identifying the higher 16 bits of the source id word); timestampL (identifying the lower 16 bits of the timestamp word); timestampH (identifying the higher 16 bits of the timestamp word); direction (identifying the session direction as SINK or SOURCE); timeInc (identifying the timestamp increment sample count); probation (identifying the number of packets that are permitted before a bad sequence is registered); seq (identifying the current sequence number); lastSeq (identifying the last seq number seen); badSeq (identifying the last bad sequence number); mpt (identifying marker and payload type information); rate (identifying the packetization rate, e.g., expressed as the number of packets per header); rateCount (identifying the decrements for rate).

b) Formation of Packets to be Transmitted

The slave processing module invokes a function, e.g., RTP_packetize( ), to generate packet information based on received packet data. This function creates an RTP packet header by extracting information from the session's state information at the memory location pointed to a pointer, e.g., pointer dest_ptr. In one embodiment, the RTP packet header has variable length. Hence, the RTP_packetize( ) function returns the size in words of the generated header. This allows the slave processing module to provide an index past the location pointed to by dest_ptr as the memory location where the RTP payload area will begin. That is, the area where the payload will begin is defined by (dest_ptr+return_value).

c) Decoding of Received Packets

The slave processing module invokes a function, e.g., RTP_unpacketize( ), to unpack packets received from the host processing module. This function checks the RTP header of a received packet at an identified buffer memory location for validity based on the session information maintained in the session's state information. The packet may fail the validity check for various reasons. For instance, the packet may have an incorrect version field. Alternatively, the header may contain settings unsupported by the version of RTP in use. Alternatively, the packet's SSRC may not be equal to the session's SSRC. Alternatively, if the packet's sequence number equals the last seen sequence number, the packet is considered a duplicate. Alternatively, the packet's payload field may not be equal to the session's expected payload type, in which case the packet is discarded. Those skilled in the art will appreciate that the slave processing module may be configured to identify additional error conditions depending on the particular environment in which it is deployed.

d) Closing a Communication Session

At the termination of a communication session the host processing module sends a command to the slave processing module to terminate a communication session. The slave responds by marking the session as closed. To facilitate this task, the slave processing module may invoke an RTP_endSession( ) function.

e) Compilation of Statistical Information

In one embodiment, the host processing module transmits a request for statistical information to the slave processing module via the command path. The host processing module may formulate this request using a "get parameter" command. This commands requests that the slave processing module extracts the parameter (or parameters) requested by the host. The slave processing module responds to the "get parameter" command by forwarding the requested parameters to the host processing modules. The transfer of commands and parameter information may be performed in the manner described above. For instance, the host processing module may set up one or more data structures prior to executing the "get parameter" command which will be populated by parameters retrieved by the slave processing module.

To facilitate the above-described tasks, the slave processing module maintains a data structure, e.g., RTP_RTCPStats, which encapsulates statistical information for forwarding to the host processing module. The structure includes the following information: totalL (identifying the lower 16 bits of a word that identifies the total packets transmitted in a communication session); totalH (identifying the higher 16 bits of the above-identified word); lost (identifying a rough estimate of the number of packets lost); duplicate (identifying a rough estimate of the number of duplicate packets); and late (identifying the number of packets that have arrived late). The host processing module may maintain similar data structures for storing statistics received from the slave processing module.

In conclusion, the above-described processing may be described in terms of state transitions in separate state machines allocated to the host processing module and slave processing module, respectively. That is, the host processing module runs through various states associated with different aspects of the communication session defined above. The states may include: an idle communication state in which there is no ongoing communication; an initialization state in which the slave processing module has been initialized; a communication state in which data is being exchanged with the slave processing module; a termination state in which the host processing module has terminated the communication session; etc. In similar fashion, the slave processing module also sequences through the above-described states. The commands transmitted by the host processing module to the slave processing module serve to instruct the slave processing module to transition from one state to another.

The above invention has been described principally in the context of the distributed processing of RTP audio data. However, the principles described herein also apply to the processing of audio data (and other data) using other types of formats.

Other modifications to the embodiments described above can be made without departing from the spirit and scope of the invention, as is intended to be encompassed by the following claims and their legal equivalents.

What is claimed is:

1. A system for distributed processing of packet data containing audio information comprising:
    a host processing module for exchanging packet data containing audio information with a data packet network, wherein the host processing module includes host logic for performing non-real-time processing of the packet data; and
    a slave processing module coupled to the host processing module for exchanging packet data with the host processing module, wherein the slave processing module includes slave logic for performing real-time processing of the packet data, and for interfacing with a media device, wherein transmission of data packets over the data packet network uses a first data format, and transmission of data packets between the host processing module and the slave processing module uses a second data format, wherein the first format differs from the second data format.

2. The system of claim 1, wherein the host and the slave logic are configured to process packet data coded in conformance with a real time protocol format.

3. The system of claim 2, wherein host logic includes at least one of:
    logic for performing RTCP generation and reporting;
    logic for interfacing with the data packet network; and
    logic for executing one or more user application programs.

4. The system of claim 2, wherein the slave logic includes at least one of:
    logic for performing RTP generation or validation; and
    logic for performing time-stamp reordering.

5. The system of claim 2, wherein the host and the slave logic are configured to process packet data coded in different packet formats.

6. The system of claim 1, wherein the slave processing module comprises:
    logic for generating multiple packet fragments, and for forwarding the fragments to the host processing module, wherein the slave processing module is configured to associate a single header with the multiple packet fragments.

7. The system of claim 1, wherein the host processing module further comprises:
    logic for receiving multiple packet fragments from the slave processing module, and for consolidating the multiple fragments into a single packet for transmission to the packet network; and
    logic for receiving a single packet from the packet network, and for breaking the single packet in multiple fragments for transmission to the slave processing module.

8. The system of claim 1, wherein the host logic includes logic for transmitting commands to the slave processing module via a command interface path, and the slave processing module includes logic for receiving and executing the commands.

9. The system of claim 8, wherein the commands include at least one of:
    an initialize command for initializing one or more communication sessions, wherein the one or more communication sessions is comprised of voice data converted into RTP encapsulated packets;
    an end command for ending the one or more communication sessions involving the media device; and
    a statistics reporting request command for requesting the slave processing module to forward statistics that the slave processing module has collected to the host processing module.

10. The system of claim 8, wherein the host processing module's logic for transmitting commands includes:
    a set function for setting parameter information in the slave processing module;
    and a get function for commanding the slave processing module to forward parameter information to the host processing module.

11. The system of claim 1, wherein the slave processing module includes statistics logic for compiling statistics for transmission to the host processing module in a status reporting communication path.

12. The system of claim 1, wherein the host processing module comprises a first digital signal processing unit, and the slave processing module comprises a second digital signal processing unit.

13. The system of claim 1, wherein the host processing module and the slave processing module comprises separate tasks performed by a single digital signal processing unit configured to function in a multi-tasking processing mode.

14. The system of claim 1, wherein the host logic includes:
    application logic for performing user application-related tasks; and
    voice processing interface (VPI) logic for interfacing with the application logic and the slave processing module.

15. The system of claim 1, wherein the data packet network comprises the Internet.

16. A slave processing module for processing of the packet data containing audio information, wherein the slave processing module interfaces with a host processing module that is configured for exchanging packet data containing audio information with a data packet network, wherein the host processing module includes host logic for performing non-real-time processing of the packet data, and wherein transmission of data packets over the data packet network uses a first data format, and transmission of data packets between the host processing module and the slave processing module uses a second data format, wherein the first format differs from the second data format, the slave processing module comprising:
    slave logic for performing real-time processing of the packet data, and for interfacing with a media device, wherein the host and the slave logic are configured to process packet data coded in conformance with a real time protocol format, and wherein the slave logic includes at least one of:

logic for performing RTP generation or validation; and
logic for performing time-stamp reordering.

17. The slave processing module of claim 16, wherein the host logic includes logic for transmitting commands to the slave processing module in a command interface path, and the slave processing module includes logic for receiving and executing the commands.

18. The slave processing module of claim 17, wherein the commands include at least one of:
an initialize command for initializing one or more communication sessions involving the media device, wherein the one or more communication sessions is comprised of voice data converted into RTP encapsulated packets;
an end command for ending the one or more communication sessions involving the media device; a statistics reporting requests command for requesting the slave processing module to forward statistics that the slave processing module has collected to the host processing module.

19. The slave processing module of claim 16, wherein slave processing module includes logic for compiling statistics for transmission to the host processing module in a status reporting communication path.

20. The slave processing module of claim 16, wherein the host processing module comprises a first digital signal processing unit, and the slave processing module comprises a second digital signal processing unit.

21. The slave processing module of claim 16, wherein the host processing module and the slave processing module comprise separate tasks performed by a single digital signal processing unit configured to function in a multi-tasking processing mode.

22. The slave processing module of claim 16, wherein the data packet network comprises the Internet.

23. The slave processing module of claim 16, wherein the host and the slave logic are configured to process packet data coded in different packet formats.

24. A method for distributed processing of the packet data containing audio information in a system including a host processing module and a slave processing module for exchanging information between a data packet network and a media device, wherein the method comprises:
performing non-real time processing of packet data using the host processing module; and
performing real-time processing of the packet data using the slave processing module, wherein transmission of data packets over the data packet network uses a first data format, and transmission of data packets between the host processing module and the slave processing module uses a second data format, wherein the first format differs from the second data format.

25. The method of claim 24, wherein the processing performed by the host and the slave processing modules is in conformance with the real time protocol format.

26. The method of claim 25, wherein processing performed by the host processing module includes at least one of:
performing RTCP generation and reporting;
interfacing with the data packet network; and
executing one or more user application programs.

27. The method of claim 25, wherein the processing performed by the slave processing module includes at least one of:
performing RTP generation or validation; and
performing time-stamp reordering.

28. The method of claim 27 further including the steps, performed by the slave processing module, of:
generating multiple packet fragments, with one header assigned to the fragments; and
forwarding the fragments to the host processing module.

29. The method of claim 27 further including the steps, performed by the host processing module, of:
receiving multiple packet fragments from the slave processing module, and consolidating the multiple fragments into a single fragment for transmission to the packet network; and
receiving a single packet from the packet network, and dividing the single packet into multiple fragments for transmission to the slave processing module.

30. The method of claim 25, wherein the processing performed by the host and the slave processing modules is in conformance with different packet formats.

31. The method of claim 24, further including the step of transmitting, by the host processing module, a command to the slave processing module in a command interface path for execution by the slave processing module.

32. The method of claim 31, wherein the command includes one of:
an initialize command for initializing one or more communication sessions involving the media device, wherein the one or more communication sessions is comprised of voice data converted into RTP encapsulated packets;
an end command for ending the one or more communication sessions involving the media device; and
a statistics reporting request command for requesting the slave processing module to forward statistics that the slave processing module has collected to the host processing module.

33. The method of claim 24, wherein the host processing module performs the steps of:
performing a set function for setting parameter information in the slave processing module; and
performing a get function for commanding the slave processing module to forward parameter information to the host processing module.

34. The method of claim 24, wherein the slave processing module performs the step of compiling statistics for transmission to the host processing module in a status reporting communication path.

35. The method of claim 24, wherein the host processing module comprises a first digital signal processing unit, and the slave processing module comprises a second digital signal processing unit.

36. The method of claim 24, wherein the host processing module and the slave processing module comprises separate tasks performed by a single digital signal processing unit configured to function in a multi-tasking processing mode.

37. The method of claim 24, wherein the data packet network comprises the Internet.

38. A method for distributed processing of packet data containing audio information in a system including a host processing module and a slave processing module for exchanging information between a data packet network and a media device, wherein the host processing module is configured to perform non-real-time processing of packet data, wherein the slave processing module and the slave processing module are configured to process packet data coded in conformance with the real time protocol format, and wherein transmission of data packets over the data packet network uses a first data format, and transmission of data packets between the host processing module and the slave processing module uses a second data format, wherein the first format differs from the second data format, wherein the method comprises:

performing real-time processing of the packet data using the slave processing module, wherein the real-time processing includes at least one of:

performing RTP generation or validation; and performing time-stamp reordering.

39. The method of claim 38, wherein the host processing module is configured to transmit commands to the slave processing module in a command interface path, and wherein the method further includes the step of receiving and executing the commands by the slave processing module.

40. The method of 39, wherein the commands include at least one of:

an initialize command for initializing one or more communication sessions involving the media device, wherein the one or more communication sessions is comprised of voice data converted into RTP encapsulated packets;

an end command for ending the one or more communication sessions involving the particular media device and the at least one other participant; and a statistics reporting request command for requesting the slave processing module to forward statistics that the slave processing module has collected to the host processing module.

41. The method of claim 38, wherein the slave processing module performs a step of compiling statistics for transmission to the host processing module in a status reporting communication path.

42. The method of claim 38, wherein the host processing module comprises a first digital signal processing unit, and the slave processing module comprises a second digital signal processing unit.

43. The method of claim 38, wherein the host processing module and the slave processing module comprise separate tasks performed by a single digital signal processing unit configured to function in a multi-tasking processing mode.

44. The method of claim 38, wherein the data packet network comprises the Internet.

45. The method of claim 38, wherein the host processing module and the slave processing module are configured to process packet data in different packet formats.

46. A computer-readable medium for storing computer readable instructions when carried out by a computer for carrying out a method for distributed processing of the packet data containing audio information in a system including a host processing module and a slave processing module for exchanging information between a data packet network and a media device, the computer-readable medium comprising:

logic for performing non-real time processing of packet data using the host processing module; and logic performing real-time processing of the packet data using the slave processing module, wherein the transmission of data packets over the data packet network uses a first data format, and transmission of data packets between the host processing module and the slave processing module uses a second data format, wherein the first format differs from the second data format.

* * * * *